J. W. OUTTERSIDE.
REVOLVING DEAD CENTER FOR LATHES.
APPLICATION FILED AUG. 1, 1911.
1,032,496.
Patented July 16, 1912.
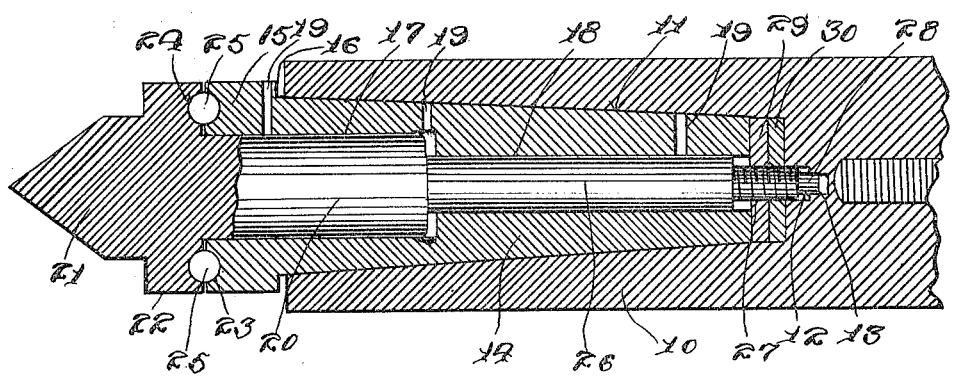
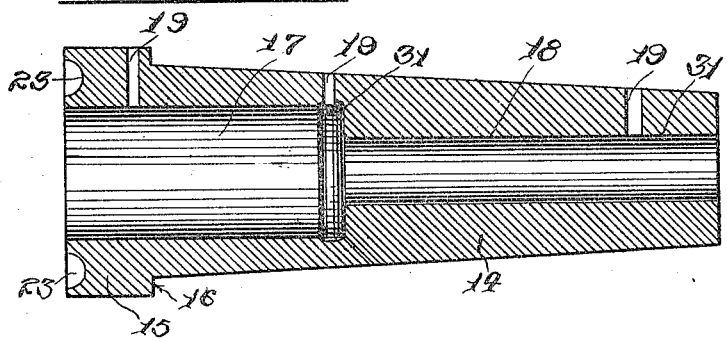
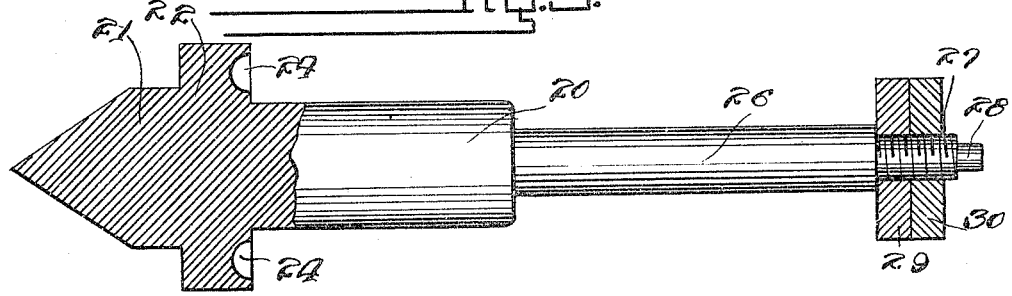
James W. Outterside
INVENTOR
WITNESSES

UNITED STATES PATENT OFFICE.

JAMES WHITE OUTTERSIDE, OF WINNIPEG, MANITOBA, CANADA.

REVOLVING DEAD-CENTER FOR LATHES.

1,032,496.  Specification of Letters Patent.  Patented July 16, 1912.

Application filed August 1, 1911. Serial No. 641,764.

*To all whom it may concern:*

Be it known that I, JAMES WHITE OUTTERSIDE, a subject of the King of Great Britain, residing at Winnipeg, in the Province of Manitoba and Dominion of Canada, have invented certain new and useful Improvements in Revolving Dead-Centers for Lathes, of which the following is a specification, reference being had therein to the accompanying drawing.

This invention relates to lathe spindles and the principal object of the same is to so construct the spindle that the dead center spindle may be tightened when worn.

Figure 1 is a longitudinal section through the spindle. Fig. 2 is a longitudinal section through the sleeve. Fig. 3 is a view partially in longitudinal section and partially in side elevation of the dead center.

Referring to the accompanying drawings by numerals, it will be seen that this invention comprises a spindle 10 which is provided with a longitudinally extending tapered socket 11 the inner end of which ter minates in a reduced socket 12 having a smaller inner end portion 13. A tapered sleeve 14 fits within the socket 11 and is provided with an enlarged outer portion 15 which provides a shoulder 16 to prevent the sleeve being inserted beyond a desired amount. The sleeve is provided with a longitudinally extending opening 17 having a reduced inner portion 18 and also with transverse openings 19 which permit oil to be fed to the dead center spindle 20 which is rotatably mounted in the opening 17. The dead center spindle 20 is provided with a dead center 21 at its outer end and with an enlarged shoulder 22 which abuts against the outer end 15 of the sleeve 14. The outer face of the sleeve is provided with a ball-bearing race 23 and the shoulder 22 is provided with a similar race 24. Balls 25 are mounted in the race so that the friction be tween the dead center spindle and the sleeve will be reduced. The dead center spindle is provided with a reduced inner portion 26 and with a reduced threaded end 27 terminating in a smaller end 28. The portion 26 fits within the reduced portion 18 of the opening 17 and the dead center spindle is held within the sleeve by means of a nut 29 which is locked by means of a nut 30. The nut 29 is screwed upon the threaded portion 27 to such an extent that the dead center spindle will be permitted to turn freely, but will be held against undue longitudinal movement. Oil is fed through the openings 19 so that the dead center spindle will be lubricated; the sleeve being provided with internal oil recesses 31. After the dead center spindle is mounted upon the sleeve, the sleeve is forced within the socket 11 with the end of the threaded portion 27 fitting within the reduced portion 12 of the socket and the reduced end 28 fitting within the smaller end portion 13 of the socket. The spindle is now in a position to be used. After the spindle has been used some time the balls wear so that the dead center spindle is permitted to have undue longitudinal movement. The sleeve is then removed and the nut 30 loosened and the nut 29 tightened so that the dead center spindle is drawn farther within the sleeve. The nut 30 is then tightened so that the spindle will be held in the adjusted position and the spindle is then inserted within the socket 11.

What I claim is:—

A device of the character described comprising a sleeve provided with a longitudinally extending opening having an enlarged outer end portion, said sleeve provided with an internal circumferential groove at the inner end of said enlarged portion of said opening, transversely extending openings formed through said sleeve, one of said openings communicating with said groove, a spindle mounted in said sleeve and provided with a reduced inner end portion terminating in a threaded end, locking means threaded upon the inner end of said spindle, and anti-friction bearings positioned between the end of said sleeve and said spindle.

In testimony whereof I hereunto affix my signature in presence of two witnesses.

JAMES WHITE OUTTERSIDE.

Witnesses:
W. E. INGERSOL,
JAS. J. MCBRIDE.

Copies of this patent may be obtained for five cents each, by addressing the "Commissioner of Patents, Washington, D. C."